United States Patent
Hermanns et al.

(10) Patent No.: US 6,592,066 B1
(45) Date of Patent: *Jul. 15, 2003

(54) THREAD GUIDE FOR TRAVERSING A THREAD IN A ROTATING WINDING BOBBIN

(75) Inventors: Ferdinand-Josef Hermanns, Erkelenz (DE); Franz-Josef Flamm, Stolberg (DE); Christian Sturm, Krefeld (DE)

(73) Assignee: W. Schlafhorst AG & Co. (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/868,389

(22) PCT Filed: Dec. 15, 1999

(86) PCT No.: PCT/EP99/09945
§ 371 (c)(1),
(2), (4) Date: Sep. 17, 2001

(87) PCT Pub. No.: WO00/37345
PCT Pub. Date: Jun. 29, 2000

(30) Foreign Application Priority Data

Dec. 18, 1998 (DE) .......................... 198 58 547

(51) Int. Cl.⁷ .................... B65H 54/28; H02K 35/00
(52) U.S. Cl. ................ 242/477.3; 242/481.2; 242/483.9; 310/17; 310/19; 310/20; 318/127
(58) Field of Search .................... 242/481.2, 477.3, 242/483.9, 480.8; 310/15, 17, 19, 20, 21; 318/123, 127

(56) References Cited

U.S. PATENT DOCUMENTS

| | | | | |
|---|---|---|---|---|
| 2,848,173 A | * | 8/1958 | Hebberling | 242/480.4 |
| 2,869,797 A | * | 1/1959 | Clerc | 242/477.3 |
| 3,094,292 A | * | 6/1963 | Hebberling | 242/481.2 |
| 4,398,167 A | | 8/1983 | Dickie et al. | |
| 5,908,170 A | * | 6/1999 | Kunz | 242/477.3 |
| 6,225,712 B1 | * | 5/2001 | Miyamoto et al. | 310/15 |
| 6,311,919 B1 | * | 11/2001 | Hermanns et al. | 242/477.3 |

FOREIGN PATENT DOCUMENTS

| | | |
|---|---|---|
| CH | 599 706 A | 5/1978 |
| DE | AS 1 131 575 | 6/1962 |
| DE | 0S 1 560 360 | 2/1971 |
| DE | 39 07 125 A1 | 9/1989 |
| DE | 0 311 827 A2 | 8/1990 |
| DE | 0 453 622 A1 | 10/1991 |
| DE | 198 20 464 A1 | 9/1999 |
| EP | 0 808 791 A2 | 11/1997 |
| EP | 0 838 422 A1 | 6/1999 |

OTHER PUBLICATIONS

Japanese Patent Abstract Publication No. 08217332; Published Aug. 27, 1996.
PCT Search Report.

* cited by examiner

Primary Examiner—Michael R. Mansen
(74) Attorney, Agent, or Firm—Kennedy Covington Lobdell & Hickman, LLP

(57) ABSTRACT

A thread guide (33) for traversing and guiding a thread (5) in a rotating winding bobbin (1) for producing a cross-wound bobbin in a bobbin winder of a textile machine by controlling vibrations of the thread guide. The thread guide (33) is permanently and directly connected to at least one energy accumulator (20,21) throughout the entire traversing motion. The potential energy of the energy accumulator (20,21) increases continuously after the dead center of the traversing area. A substantially harmonious oscillating mechanical system is thus formed with the thread guide.

16 Claims, 6 Drawing Sheets

THREAD GUIDE FOR TRAVERSING A THREAD IN A ROTATING WINDING BOBBIN

BACKGROUND OF THE INVENTION

The invention relates to a yarn guide for the traversing feeding of yarn to a rotatingly driven winding bobbin for producing a cheese in a winding head of a textile machine.

For the creation of textile bobbins it is necessary in principle to cause the bobbin to rotate, for one, and furthermore to traverse the yarn running up on the rotating bobbin along the bobbin axis. If the yarn is traversed very slowly, a bobbin with largely parallel windings is created. If such a bobbin is to have a larger volume and flat front faces, which are essentially arranged at right angles in respect to the bobbin axis, limiting flanges are required on both sides of the winding. These limiting flanges can be omitted if the yarn traverses so rapidly that crosswise winding results. High winding speeds then also demand a very high traversing rate.

Driving means oriented parallel in respect to the bobbin axis, for example belts, can be employed for this EP 0 311 827 A2 describes such a yarn guide, wherein the belt is driven by means of a step motor controlled by a microprocessor. By means of this it is possible to achieve high traversing speeds, and the yarn guide can be controlled relatively precisely.

A yarn guide, which is roughly assigned to the category of belt yarn guides, is also described in EP 0 453 622 B 1, which can generate the most diverse winding patterns by means of an appropriately controlled step motor, or also an electronically commutated disk-armature motor. Here, the motor is coupled to a driving wheel, around which a string, which carries a yarn guide support for the yarn guide, has been wound several times. A gear wheel is arranged on the same shaft, which meshes with two gear wheels arranged on both sides. In turn, these two gear wheels are fastened on torsion bars, each of which is prestressed in such a way that they are deflected in respect to their equilibrium position during the entire traversing interval of the yarn guide. It is intended by this to avoid load changes, which could lead to damage to the gear drive, particularly at high traversing speeds.

It is intended by the use of the torsion bars to make possible the large angular acceleration required in the area of the reversing points of the yarn guide. Couplings are provided for increasing this effect, which are intended to fix the torsion bars in place near the gear drive prior to the reversing points being reached, in order to achieve with this a shortening of the effective length of the torsion bars together with an abrupt change of the spring constant. For one, this construction makes great demands on the mechanical portions of the coupling, and the gear drive is furthermore not inconsiderably stressed. As a whole, the yarn guide, its yarn guide support, which is displaceable in a sliding rail, the string moving the yarn guide, reversing rollers for this string and the gear drive add to the inertia of the entire system, which has negative effects in particular at the reversing points of the traversed area.

So-called reversing thread rollers which, in connection with rapidly running bobbin winding machines, often effect the circumferential drive for the cheese simultaneously, are widely used for creating the traversing motion. However, here the same displacement angle always prevails, regardless of the fullness of the bobbin, wherein so-called winding patterns are created at defined number of revolution ratios between the bobbin and the drive roller, which lead to considerable problems in the course of subsequent unwinding. For this reason a multitude of so-called pattern disruption methods are described by the prior art.

For being able to create a predetermined winding pattern, for example a precision winding or a stepped precision winding, the drive of the bobbin must therefore be separated from the yarn guide. Inter alia, this is possible by arranging the already mentioned reversing thread roller at a distance from the winding bobbin and to drive it separately. As a rule, a yarn guide then slides in the reversing thread groove. Because of inertia, this system also suffers from disadvantages.

So-called finger yarn guides have been known for a long time (for example, DE-AS 11 31 575, DE-OS 15 60 360), wherein a yarn guide finger is pivotable around an axis which is arranged essentially vertically in respect to the winding bobbin axis. With this finger yarn guide, the transfer of the oscillating motion also takes place interlockingly by means of a cam disk, either directly to the finger yarn guide, as in DE-OS 15 60 360, or via a traversing rod, on which a double lever is resiliently suspended, which itself engages the finger-shaped yarn guide, as in DE-OS 11 31 575. The double lever additionally receives a pulse at the reversing points by means of an abutment, which favors the rapid reversal of direction at the edge of the traversing zone. However, in this case the abutment does not lead to considerable noise emissions or to a reduction of the service life of the device, since the invention is used for the creation of flanged bobbins, with which only a very narrow displacement angle is used. The advantage of both finger yarn guides is that the finger itself constitutes the yarn guide, without a sliding piece, which increases inertia, being additionally required here. Nevertheless, these yarn guides are also limited in respect to the flexibility of the yarn traverse.

Electromechanical drive mechanisms in place of the conventional mechanical drive mechanisms for the fingers used as yarn guides described here have been proposed in the meantime, such as indicated, for example, in EP 0 808 791 A2 or EP 0 838 442 A1, which defines the species.

The energy storage devices at the ends of the stroke of the yarn guide described and represented in EP 0 838 442 A1 are intended to assist the movement direction reversal of the yarn guide and therefore to relieve its drive mechanism, as well as to reduce the dwell time at the ends of the stroke. The position of the energy storage devices can be mechanically changed, so that the stroke of the yarn guide can be adjusted in order to avoid arched edges on the cheese, for example.

Because of the relatively jolting braking of the yarn guide when dipping into the respective energy storage device, such energy storage devices lead to a reduction in the service life of the traversing system, or require that it must have sufficient sturdiness so that its mass, and therefore mass inertia, is increased. At traversing frequencies of 30 Hz and more, however, the mass inertia already plays a considerable role in connection with the drive mechanism. Moreover, noise is created when the yarn guide impacts on the energy storage device, which adds up correspondingly because of the customarily long textile machines.

If the drive mechanism of the yarn guide is regulated by a control device, load bounces result in the area where the yarn guide dips into the energy storage device, which impair the regulating quality of the control.

SUMMARY OF THE INVENTION

It is therefore the object of the invention to improve the oscillation behavior of the yarn guide.

In accordance with the invention, this object is attained by means of a novel yarn guide for the traversing feeding of a yarn to a rotatingly driven winding bobbin for producing a cheese in a winding head of a textile machine. In accordance with the present invention, the yarn guide is directly connected with at least one mechanical energy storage device which is permanently coupled with the yarn guide during the entire traversing movement for aiding the reversal of the direction of movement. The potential energy of the mechanical energy storage device continuously increases in the direction toward the dead points of the traversed area. As a result, the mechanical energy storage device together with the yarn guide constitute an essentially harmoniously oscillating mechanical system.

The invention is advantageously further developed by the below-described additional features.

The direct connection of the yarn guide with a mechanical energy storage device results in that no indirect transfer of forces is necessary at all. The only mass creating a moment of inertia is constituted by the yarn guide itself. By means of this the dynamics of the system are clearly improved over the prior art. The forces and moments of inertia in the area of the considerable angular accelerations at the reversing points are very small. It is possible to achieve a very rapid reversal of the direction of movement in the area of the end areas of the traversing movement without a considerably energy outlay.

In this connection it should be pointed out that in accordance with the present invention the entire oscillating body consisting of the yarn guide finger, the shaft supporting it, as well as the coil used as drive mechanism and its frame, are called the yarn guide.

It is possible to change the traversing width exclusively by means of the drive mechanism, i.e. by means of control or regulation. No mechanical adjustment at all is required for this if the energy storage device is designed for a maximum yarn guide stroke. Since with an increased stroke the torque required in the area of the reversal of the movement direction is also increased, the greater potential energy of the energy storage device being created in case of an increased stroke is useful. The noise level is lowered by the jolt-free operation of the yarn guide, and its service life is increased. Moreover, the regulating quality of the control is improved and the precise keeping of the traversing width is simplified.

The employment of a torsion spring, in particular a helical spring, is particularly advantageous in connection with the yarn guide of the invention. With an oscillation amplitude of, for example 60 to 70E, applicable here, such a helical spring also has the same progression of the characteristic curve of the spring to the left and right of the zero point. However, two helical springs can also be employed, which can then additionally be used for the electrical current supply for a coil of a drive mechanism of the yarn guide.

If the helical springs have opposite winding directions, the same spring torque progression is achieved in both oscillation directions in every case. However, as already mentioned, this advantage gains importance only if the angle of the deflection of the yarn guide out of the position of rest exceeds a threshold value, because in that case the progression of the characteristic curve of the spring is different during opening and closing of the spring.

While the energy storage device reduces the area under the graph of the drive torque square up to a third of the value which would be necessary without such an energy storage device anyway, setting the resonance frequency of the oscillating system to the upper limit of the required oscillation frequency leads to the support of the oscillating motion, and therefore the relief of the electromechanical drive mechanism, being especially intense during extreme situations.

It is assured by the sturdiness of the arrestment of the energy storage device, that the energy storage device aids the oscillating motion in both directions to the same extent.

There is, of course, also the possibility to make the selection of the springs from the start in such a way, that their characteristic spring curves corresponds as much as possible to the desired oscillation behavior. In this connection it is even desirable that the characteristic spring curve does not extend in a straight line, but instead progressively increases after the reversing point, as already mentioned. The dimensioning of the spring should be selected for optimization in such a way that the integral under the driving torque square becomes the smallest. Because of this, the required power consumption of the drive mechanism for the yarn guide is the lowest.

The flexibility of the oscillation system can be improved still further if, in addition, the suspension of the at least one spring during the oscillation movement of the yarn guide is adjusted in a controlled manner. In a range of a lesser oscillation frequency, for example 5 Hz, the spring assistance in the reversing area of the yarn guide is required not at all or only to a small extent. The energy for bending the spring or, if an additional spring is used, the two springs, must be supplied by the electrical drive mechanism of the yarn guide in the remaining oscillation range outside of the oscillation dead center points, in which no angular acceleration is present. This energy can be reduced in that the suspension of the at least one spring for all practical purposes oscillates synchronously. This means that at very low oscillation frequencies the suspension could also oscillate with the same amplitude. However, in this case the drive mechanism for the suspension must be included when determining the energy balance. It can therefore be advantageous, depending on the actual conditions, to let the suspension oscillate along at the same frequency, but with reduced amplitude. In that case the bending of the spring takes place only in the lower range of the characteristic curve of the spring.

With increasing frequency, the requirement for assisting the movement reversal increases. For this reason a relief of the spring in the area of the reversing points is disadvantageous. The potential spring energy stored in the area of the reversing points can be clearly increased by appropriate phase-shifting between the oscillating movement of the suspension and of the yarn guide. However, in this way merely a far-reaching effect on a fixed frequency would be achieved, which could also be achieved with a stronger spring or a plurality of springs.

But the flexibility of the system offers the possibility of relieving the spring over the larger part of the stroke by an oscillation of the suspension in the same direction, and to clearly increase the spring force only directly prior to reaching the reversing point by swiftly reversing the a oscillating movement of the suspension into the opposite direction.

A "weak spring" is created in this way over the larger portion of the stroke length, and a very strong spring in the reversing points. This exactly corresponds to the desired assistance of the oscillating movement of the yarn guide. However, in the course of this, the system is not disadvantageously affected by an abrupt introduction of a spring force or adjustment of a spring constant, as in the prior art already discussed. The flexibility regarding the assistance of arbitrary oscillating movements achieved in this way is not suggested by any of the solutions known from the prior art.

The high degree of flexibility of the movement of the yarn guide regarding oscillation frequency, oscillation amplitude and even oscillation progress over the length of a stroke caused by the mechanical oscillation system is additionally supported by the drive system claimed in what follows.

A relatively high magnetic flux density can be achieved within the air gap in accordance with the invention, wherein the losses are low in case of small dimensions of the air gap and sufficient dimensioning of the yokes, which have a low magnetic resistance. The torque required for deflecting the yarn guide is obtained by providing the coil located in the area of the magnetic flux lines with electrical current.

The size of the coil has a close connection with the adaptation to the gap width of the air gap in accordance with the invention, through which magnetic flux lines flow. The distance of the winding strands of the coil passing through the air gap from the pivot axis of the yarn guide affects the size of the torque which can be created by the drive mechanism. This torque is high in relation to the mass moment of inertia of the coil. The remaining portions of the body taking part in the oscillation can be made of a very light material and only need to have the sturdiness required for the occurring forces, so that a low mass moment of inertia results.

The size and direction of the torque is set by controlling, or regulating, the voltage, and therefore the electrical current, in each phase of the movement. This can take place by means of a control device, for example a microprocessor, which controls the current strength and current direction in accordance with a predeterminable program as a function of the angle and the time in such a way, that the respectively desired traversing angle of the yarn results from the traversed width, or that the traversed width or the end points of the traverse can be set. The respective angle is detected by means of appropriate sensing devices, keeping of the set value is checked and, if required, the actual value is matched to the set value by regulating it. Known PID controllers can be used for this, while a known infrared photoelectric barrier, which scans markers arranged concentrically in respect to the pivot axis, can be employed for detecting the torque angle.

The air gap, and therefore also all elements for generating the magnetic field, need merely extend over the pivot range of the electrical coil corresponding to the maximally settable traversing stroke of the yarn guide. With this, the structural outlay is appropriately limited. Also, only one electrical coil is required, which moves up and down along the appropriately dimensioned slit during oscillation. As mentioned, it is of particular importance that, the further the elements participating in the pivot movement are removed from the pivot point, the smaller the mass must be which they are allowed to have, since in the area of the dead centers of the oscillation of the yarn guide it is necessary to provide considerable angular accelerations, and therefore very high torques must be provided with a large mass moment of inertia of the oscillating parts. It is necessary here to take into account that in the course of producing cheeses on bobbin winding machines, oscillation frequencies of the yarn guide in the range of up to 30 Hz are necessary.

In contrast to an electronically commutated motor, wherein commutation during the constant effective direction of the drive motor is required, with the present invention a change in the direction of the electrical current directly leads to a reversal of the sign of the driving torque. This in turn simplifies the control of the direct drive of the oscillating yarn guide.

BRIEF DESCRIPTION OF THE DRAWINGS

The invention is to be explained in greater detail in what follows by means of exemplary embodiments. Shown in the accompanying drawings are in.

DESCRIPTION OF THE PREFERRED EMBODIMENT

Figure 1:
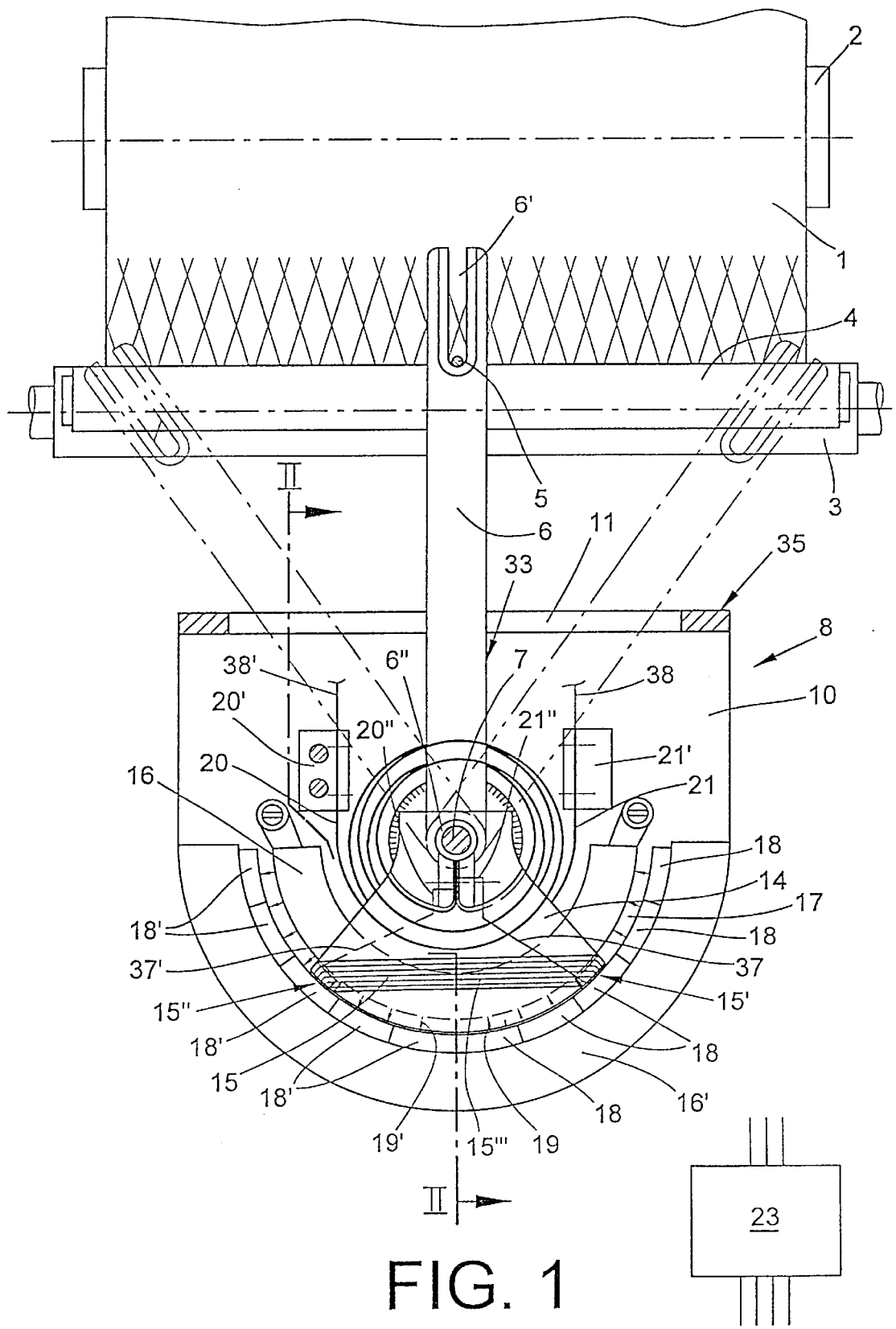
FIG. 1, a front plan view of a yarn guide in accordance with the invention with an electromechanical drive mechanism, partially cut along I—I, in accordance with FIG. 2, FIG. 2, a section II—II in relation to FIG. 1, FIG. 3, a front plan view of a variation of the yarn guide in accordance with the invention with a drive mechanism for the spring suspension, partially cut along III—III, in accordance with FIG. 4, FIG. 4, a section IV—IV in relation to FIG. 3, FIGS. 5a–5c diagram of the drive torques involved in an oscillation generation at an oscillating frequency of 5 Hz (FIG. 5a), of the progression of the angular displacement of the spring suspension (FIG. 5b), and of the associated angular velocity (FIG. 5c), and FIGS. 6a–6c the progression of the drive torques at at an oscillating frequency of 20 Hz (FIG. 6a), of the progression of the angular displacement of the spring suspension (FIG. 6b), and of the associated angular velocities (FIG. 6c).

In the portion of a winding device represented in FIG. 1, a cheese 1 can be seen, which rests on a support roller 3. The bobbin case 2 of the cheese 1 is seated in a creel, not represented. Driving of the cheese can take place via one of the tube plates of the creel, which clamp the bobbin case 2 between them. In place of the support roller 3, a drive roller can be alternatively provided, by means of which a circumferential drive is provided in comparison with the said direct drive of the cheese 1.

The yarn 5 fed to the cheese 1 is guided inside a fork-shaped guide element 6' of the yarn guide finger 6. A traversing straight edge 4 provides the straight guidance of the yarn, which is necessary for always feeding the yarn to the cheese at a constant and as short as possible a distance from the clamping line between the support roller 3 and cheese 1. This is required for achieving a satisfactory winding structure on the cheese 1.

In place of the straight guidance by means of the traversing straight edge 4, it would also be conceivable to drive a body, which contains a yarn guide eye and is seated, displaceable along the position of the traversing straight edge 4, by means of a lever which corresponds to the yarn guide finger 6. However, it should be borne in mind here, that additional inertia and friction forces must be overcome because of this which, at high traversing speeds, have a negative effect on the total a system.

Figure 2:
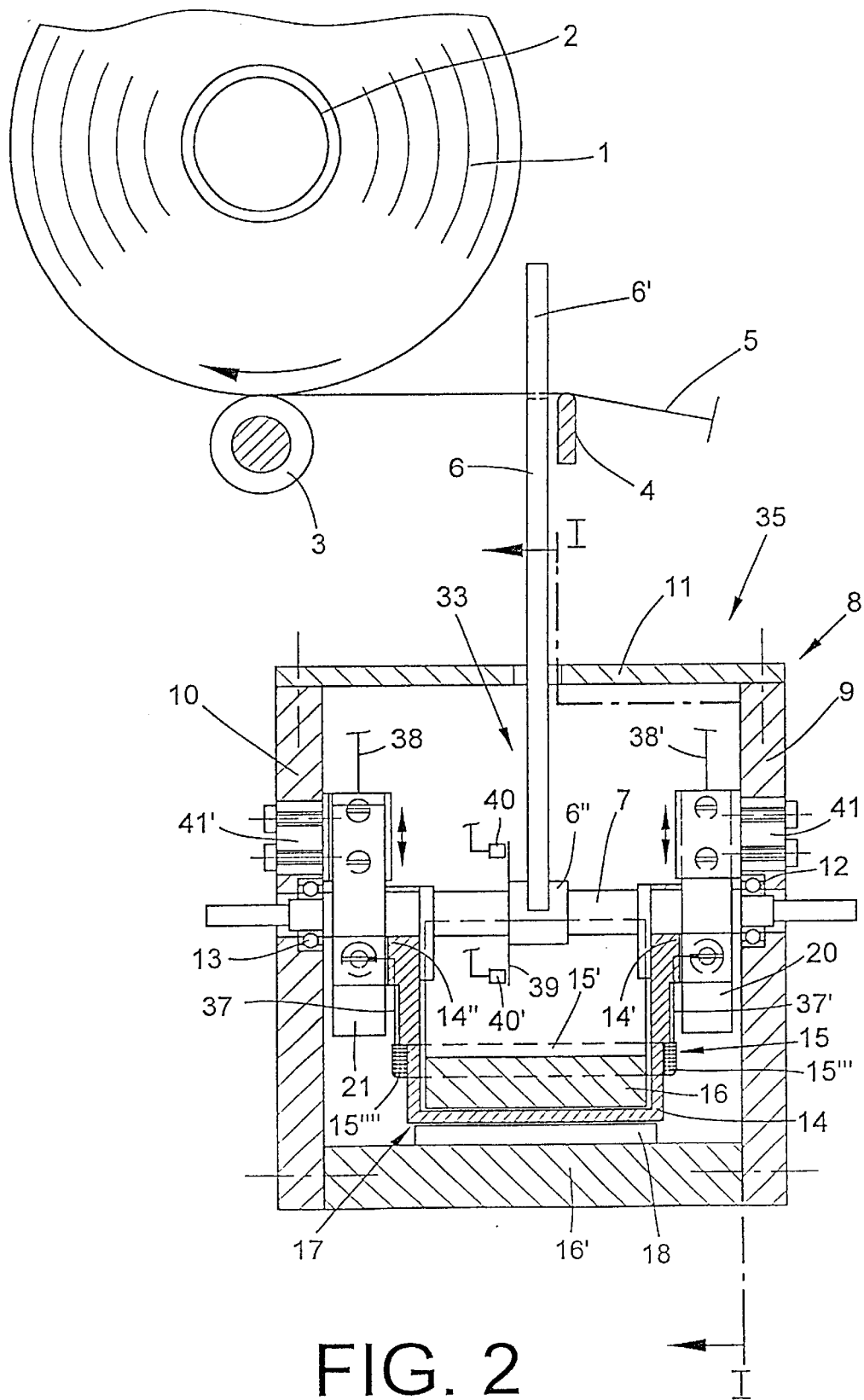

The yarn guide finger 6 is fastened by means of a holder 6' on a shaft 7 with which, together with a coil frame 14 with a coil 15, which will be described in greater detail below, it constitutes the oscillating body identified as yarn guide 33 as a whole. As can be seen in FIG. 2, the shaft 7 is seated in rolling bearings 12 and 13, which are arranged in lateral walls 9 and 10 of a housing 8. In order to limit the continued rotation because of inertia of the rolling bodies during the reversal of the movement direction of the yarn guide 33, the rolling bearing can be clamped more tightly than is customary. However, it would alternatively also be conceivable to employ different bearings, for example on a magnetic basis.

A swing-shaped coil frame 14 is also fastened on the shaft 7. Lateral tongue-shaped protrusions 14' and 14" of this coil frame are connected, fixed against relative rotation, to an inward projecting tongue of the helical springs 20 and 21, which are made of a metallic strip material. The two helical springs 20 and 21 are wound in opposite directions. A coil 15 has been wound on the coil frame 14 in such a way that its center axis intersects the axis of rotation of the yarn guide 33.

Holders 20' and 21' of the torsion springs 20 and 21 are fastened on the lateral walls 9 and 10 of the housing 8 of the drive mechanism 35. The two torsion springs 20 and 21 are firmly clamped in these holders 20' and 21'.

As indicated by a two-headed arrow in FIG. 2, the positions of the holders in respect to the lateral walls 9 and 10 can be adjusted by being displaced in elongated holes 41 and 41'. This adjustability is required for at least one of the two holders in order to achieve that, in its position of rest, the yarn guide 33 takes up the center position in the area of the oscillation amplitude. The adjustment of both torsion springs makes it possible that this center position simultaneously represents the zero point of both characteristic spring curves.

The supply of electrical current to the coil 15 is provided via supply lines 38 and 38' to the holders 20' and 21', via the torsion springs 20 and 21 as far as the fastening points at the shaft 7, and from there via supply lines 37 and 37' to the coil 15. It is assured in this way that the respective fixed supply lines are not subjected to relative movements. The relative movement is absorbed by the helical springs 20 and 21. However, other modes of supply having great flexibility are of course also conceivable. In order to limit the movement here, these supply lines should be located as closely as possible to the shaft 7.

As visible in FIG. 1, the inner yoke 16, made of a ferromagnetic material, has the shape of a segment of a circle and, as can be seen in FIG. 2, a rectangular cross section. A magnet arrangement 18, 18' is fastened on an outer yoke 16', which is also in the shape of a segment of a circle, opposite the exterior circumference of the inner yoke 16 in the shape of a segment of a circle. An air gap 17 is formed between the outer circumference of the inner yoke 16 and the magnet arrangement 18, 18', which has a gap width which is constant over its length. However, this constant gap width is not an absolute requirement. For example, the air gap 17 could be wider respectively in the center of the left and right halves of the air gap 17 and weaken the magnetic field by this, because the active winding strands 15 and 15' are located there when the yarn guide 33 takes up its center position, in which only a small or no drive torque is needed.

The magnets are differently polarized to the left and the right of the center of the pivot path of the coil 15. Because of this, magnetic flux lines 19 result in the area of the magnets 18, which are essentially oriented toward the point of rotation of the yarn guide, while magnetic flux lines 19' are formed in the area of the magnets 18', which are oriented away from the point of rotation of the yarn guide.

The flux lines extending through the yokes 16 and 16' are not represented for reasons of clarity. However, they form bridges in both yokes 16 and 16', wherein all magnetic flux lines pass through the center of the U-shaped yokes. It is therefore also possible to embody the yokes in their edge areas with a clearly reduced cross section in comparison to the center.

During the entire pivot movement of the yarn guide 33, respectively one of the two winding strands 15', or 15", of the electrical coil 15 extends in each one of the two parts of the air gap 17, which differ by the direction of the magnetic flux lines. Since, because of the winding plane of the coil 15 in the two winding strands 15' and 15", different current directions also necessarily result, the torque exerted by the magnetic field represented by the magnetic flux lines 19 and 19' on the winding strands 15' and 15" is provided with the same sign. The arc distance of the two winding strands 15' and 15" between each other is greater than the distance traveled along the air gap 17 at the maximum pivot angle of the yarn guide 33. Because of this, during the entire pivot path each one of the two winding legs 15' and 15" remains inside an area of the air gap in which the magnetic flux lines 19, or 19', extend in the same direction. Therefore the current and the torque are proportional, in particular in respect to the sign, over the entire pivot path. By means of this it is possible to keep the control, or regulating, outlay low.

The housing 8 is provided with a cover 11 containing a slit, in which the yarn guide 33 can be moved. In place of the centered application of the yarn guide finger 6 on the shaft 7, it would also be possible to fix this yarn guide finger on the shaft 7 outside of the housing 8, because of which the housing 8 can be completely encapsulated.

A disk 39 is arranged on the shaft 7 in the area of the holder 6" of the yarn guide finger 6, which has markings concentrically to the center axis of the shaft 7. These markings are scanned by means of two infrared photoelectrical barriers 40, 40'. It is possible by means of an arrangement of the two infrared photoelectrical barriers 40, 40', which is offset in relation to the division of the markings, to detect the respective direction of movement of the disk. In this way the respective angular position of the yarn guide 33 can be detected by counting the increments. For further increasing the number of increments over the pivot path it is possible to provide additional infrared photoelectric barriers, wherein the number of increments for the same pivot angle is correspondingly increased because of this. However, in order to have a sufficiently fine resolution for the controller also in the area of the reversing points of the yarn guide, the employment of an observer, such as described in DE 19 73 5581 A1, offers itself. The increments measured by the infrared sensor 40 are passed on to a microprocessor 23, in which a reference progression of the oscillation of the yarn guide is stored, and to which a controller is connected, which outputs the current I, flowing through the coil 15, or the voltage U applied to the coil 15, as the set value. By means of this it is possible to generate the desired drive torque over the entire oscillation progression. For refining the control, as well as for a constant control quality, the controller can be embodied as a PID controller, or also as a status controller, which furthermore is adaptively designed, i.e. which continuously adapts itself to the momentary existing conditions (for example, deviation in the yarn tension, bearing friction, etc.). In the same way a predictive control can be performed, i.e. taking into consideration a progression known from the start. A continuous refinement of the control quality can be achieved by means of other known control principles.

The nominal progression of the yarn placement can be set by various parameters which favor the winding structure of the cheese. For example, a stroke respiration of the yarn guide, and therefore a reduction of the edge hardness, or the edge swelling of the cheese, can be achieved by a change in amplitude. Moreover, the most different winding structures, such as precision windings or stepped precision windings can be provided without mechanical setting work. The change of the desired width of the cheese is connected with an extremely small outlay in the same way.

The selection of the helical springs can take place in such a way that the characteristic curves do not extend in straight lines to the dead points, but progressively, by which the electromechanical drive mechanism for achieving the identical oscillation is relieved.

Figure 3:
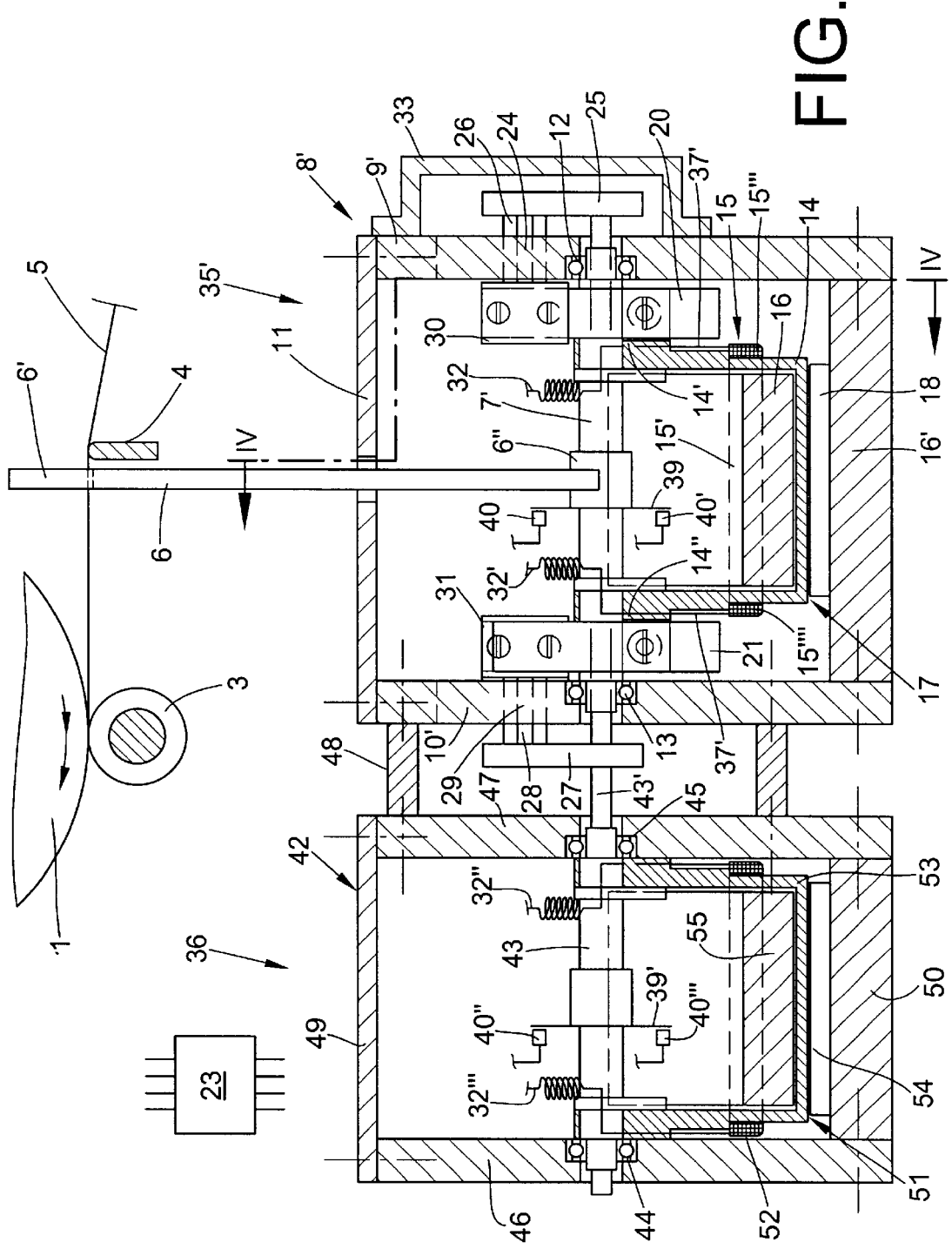
Figure 4:
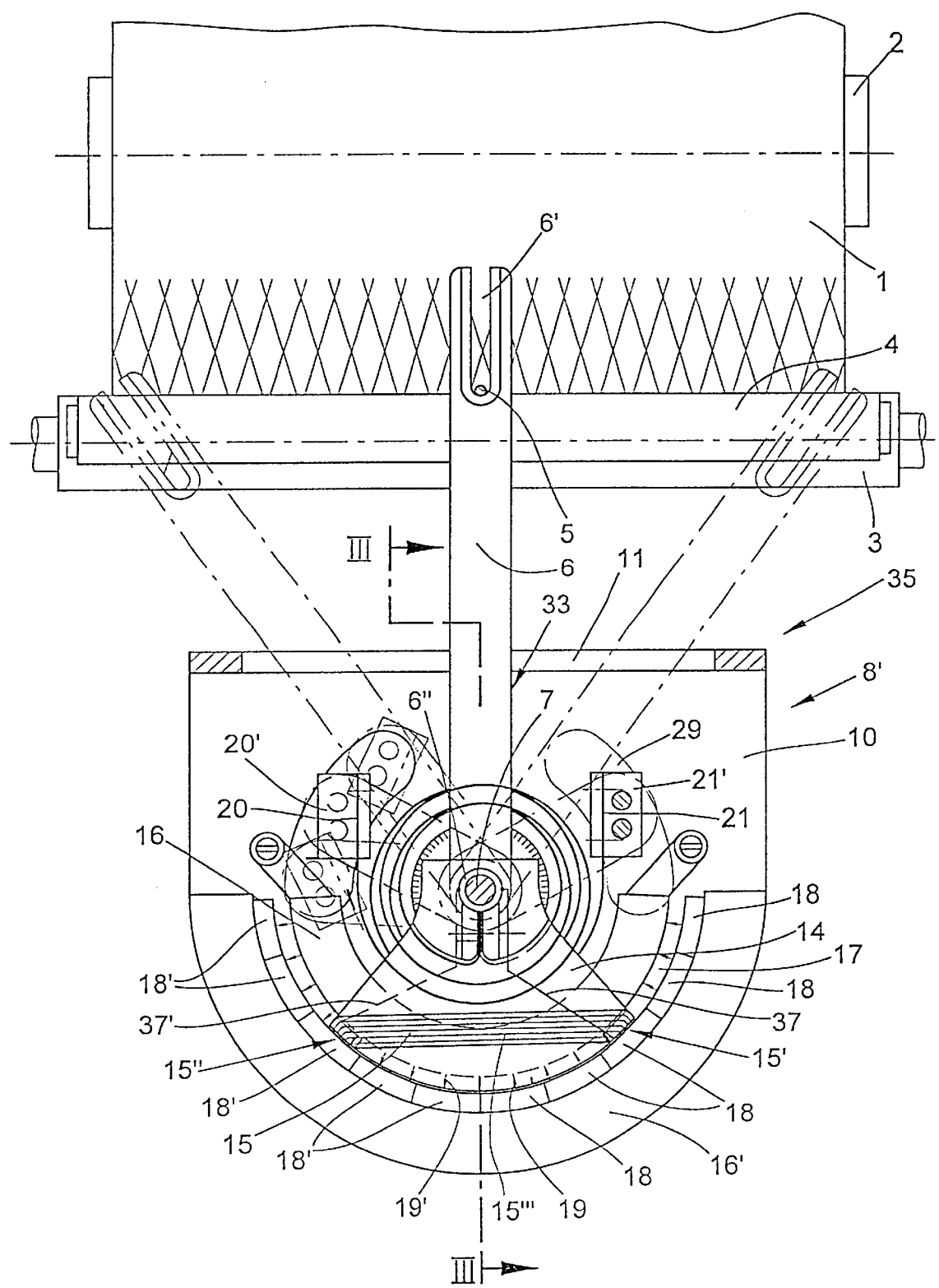

In the variations of the invention represented in FIGS. 3 and 4, the drive mechanism 35' is identical to the greatest degree with the drive mechanism 35 in accordance with the first variation. The important difference lies in the replacement of the fixed arrangement of the spring suspension in the first exemplary embodiment by a movable arrangement in the form of an oscillating movement of these suspensions 30 and 31, which is superimposed on the oscillating movement of the yarn guide 33. In this example, the springs 20 and 21 no longer are simultaneously used for the supply of electrical current because of the no longer fixed arrangement of the suspensions. In spite of this, the use of two springs instead of only one spring was retained here in this example. The electrical current supply takes place by means of flexible supply lines 32 and 32', which are represented in the form of helical lines, but can be replaced by any other flexible current conductors.

In comparison with the shaft 7 in the first exemplary embodiment, the shaft 7' is embodied as a hollow shaft, in which a portion 43', reduced in diameter, extends in a shaft 43. The shaft portion 43' supports levers 25 and 27, which in turn are connected by means of strips 26 and 28 with the suspensions 30 and 31 for the springs 20 and 21. The strips 26 and 28 pass through curved elongated holes 24 and 29 in the lateral walls 9' and 10', which are not in the way of the oscillating movement of the strips 26 and 28, which are imparted to them by the shaft 43 via the levers 25 and 27. The levers 25 and 27 are arranged in separate housings to prevent the introduction of dirt, and therefore the impairment of the ability of the device to function.

The shaft 43 is put into an oscillating rotating movement by a drive mechanism 36. Except for the omission of the springs, the drive mechanism 36 is identical with the drive mechanism 35' to the greatest extent. A coil frame 53 for a coil 52 is movably arranged along an air gap 51 in a housing 42, which consists of lateral walls 46 and 47, as well as an outer yoke 50 and a cover 49. The air gap 51 is bordered by a magnet arrangement 54 and an inner yoke 55. The coil 52 is supplied with voltage via,the supply lines 32" and 32"'. A disk 39' with markings and incremental transducers 40" and 40"' here also provides for the monitoring of the respective angular position of the shaft 43 for being processed in the control device, the microprocessor 23.

The shaft 43 is rotatably seated in the bearings 44 and 45, as well as inside the shaft 7'.

Both drive mechanisms 35' and 36 are controlled by means of the microprocessor 23 via limit stages, not represented here. By means of FIGS. 5 and 6 it is intended to explain in detail how the control of the drive mechanism 35' and 36 can be performed as a function of the required oscillation frequency.

Figure 5A:
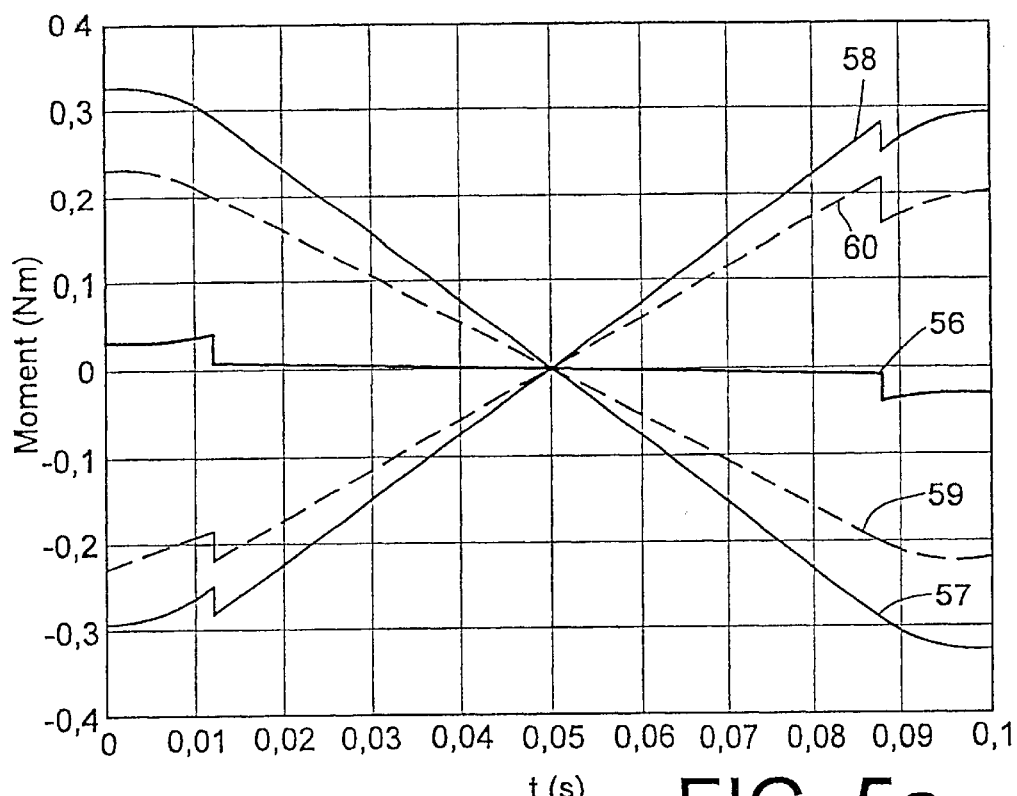
Figure 5B:
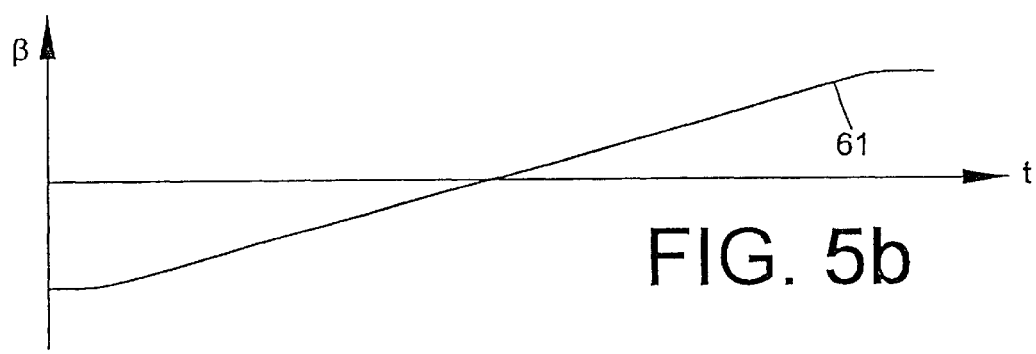

A possible progression of the drive torques at a frequency of 5 Hz is represented in FIG. 5. The curve 56 shows the torque progression of the entire torque. It can be seen here that a very small torque is required over nearly 80% of the amplitude, and a somewhat greater torque must be made abruptly available for the oscillation only in the vicinity of the dead points. The torque progression of a fixedly arranged spring in accordance with the first exemplary embodiment is represented by 57. In order to reach the total torque 56 with this torque progression of the fixed spring, the torque 58 is required, which must be provided by the drive mechanism 35.

Figure 5C:
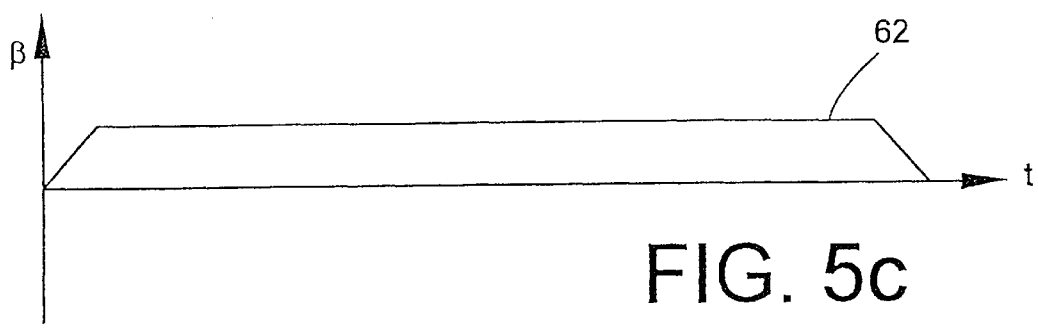

The torque progression of the spring which oscillates synchronously along is represented at 59, but with a clearly reduced oscillation amplitude of the spring suspensions. For this purpose, the twisting angle $ is represented as the curve 61 of the spring suspension on the same time line in FIG. 5b. The amplitude of the oscillation movement of the suspensions is approximately 30% of the oscillation amplitude of the yarn guide itself. Then, the progression of the angular velocity of the displacement of the spring suspension is represented in FIG. 5c. In accordance with the clearly reduced amplitude, this angular velocity T (curve 62) is appropriately low compared to the yarn guide.

Based on the torque progression 59, a lower torque 60 results for the drive mechanism 35' for achieving the total torque 56. With such a low oscillation frequency, an energy savings for the drive mechanism 35' can already result, which is greater than the power consumption of the second drive 36. It should be pointed out in this connection that no, or only very weak springs would be used for an oscillation frequency of 5 Hz here, if basically only such a low frequency would be used. The example only illustrates the advantages of the invention, even in a lower frequency range, for an oscillation system designed for clearly higher frequencies. But the advantage of the double oscillation system over the single oscillation system as represented in the first exemplary embodiment, appears more clearly in connection with higher frequencies.

Figure 6A:
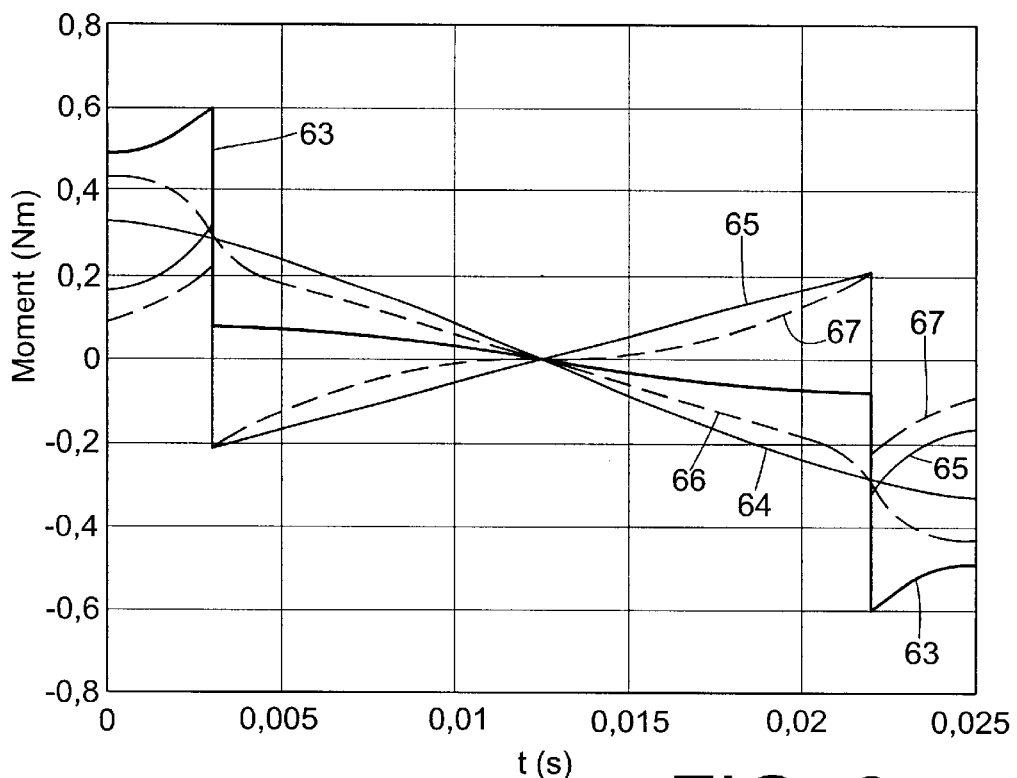
Figure 6B:
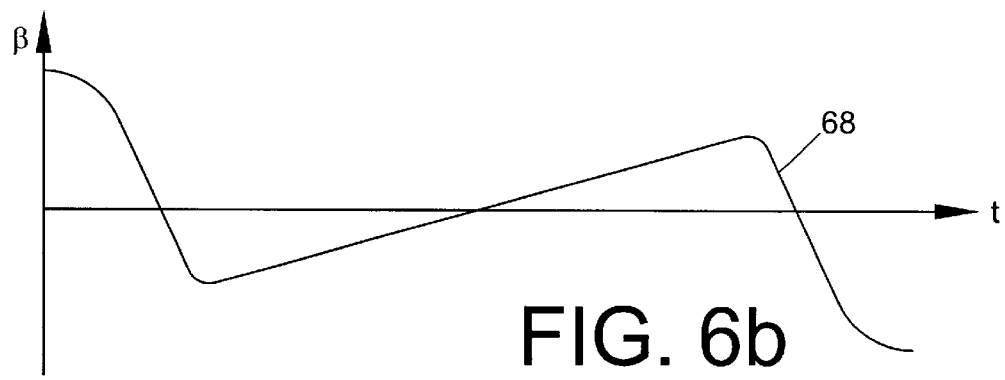
Figure 6C:
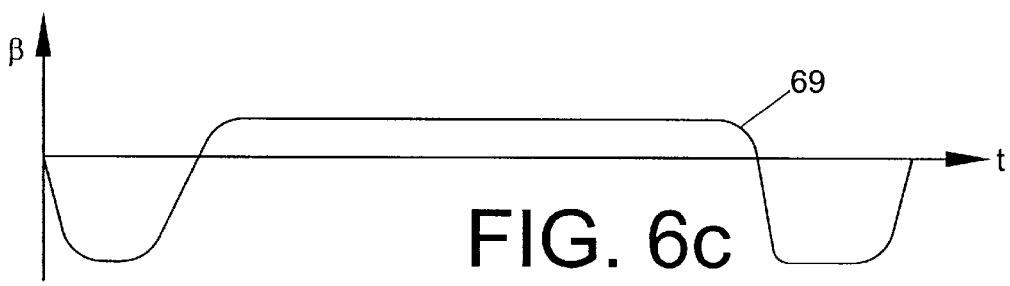

The torque progression, the twisting angle and the angular velocity of the spring suspension for an oscillation frequency of 20 Hz are represented in FIG. 6 (FIGS. 6a to 6c). A different scale is used here.

63 shows the total torque. The torque progression for a fixedly arranged spring is represented by 64, while the progression of the torque to be provided by the drive mechanism 35' is shown by 65.

Based on the twisting angle progression 68 shown in FIG. 6b, the torque progression for the springs with oscillating suspensions identified by 66 results. The movements of the yarn guide and the suspensions extend in the same direction over the greater portion of the oscillation in order to relieve the drive mechanism 35' in this way. The direction of the twisting of the spring suspensions is rapidly reversed in the range of the dead points, so that the springs are now more tightly bent than had been the case with the fixedly arranged suspensions in accordance with the first exemplary embodiment. Because of this, the drive 35' is clearly relieved, particularly in this range.

FIG. 6c shows the progression 69 of the angular velocity of the suspensions. It becomes obvious here, that the angular velocity is constant and relatively low over the greater part of the yarn guide stroke, and only assumes higher values in the area of the reversing points.

Only a very small portion of the variation options, which are possible by means of this drive mechanism, has been made clear by means of the represented examples of different oscillation frequencies. Depending on the desired movement progression of the yarn guide it is possible to represent any arbitrary changes here, which make the greatest optimized energy balance possible, while exactly maintaining the desired placement profile of the yarn.

Although the counter-oscillation system represented in the second example contains a very rapid change of the spring force, there is no abrupt mechanical load shift, such as is the case in connection with the buffers in the oscillation reversal range, or of the abrupt spring stiffening, in the prior art.

What is claimed is:

1. A yarn guide for the traversing feeding of yarn to a rotatingly driven winding bobbin for producing a cheese in a winding head of a textile machine, wherein the yarn guide has a yarn guide finger and is pivotable around an axis, which is oriented essentially vertically in respect to the bobbin axis, wherein the yarn guide has an electromechanical drive mechanism, which imparts the torque necessary for generating a predeterminable oscillation to the system in a defined manner, and wherein at least one mechanical energy storage device is permanently coupled during the entire traversing movement with the yarn guide for aiding the reversal of the direction of movement, characterized in that the yarn guide (33) is directly connected with the at least one mechanical energy storage device (20, 21, 30, 31), whose potential energy continuously increases in the direction toward the dead points of the traversed area and which, because of this, constitutes an essentially harmoniously oscillating mechanical system together with the yarn guide (33).

2. The yarn guide in accordance with claim 1, characterized in that the at least one mechanical energy storage device (20, .21, 30, 31) is constituted by a spring.

3. The yarn guide in accordance with claim 2, characterized in that the spring (20, 21, 30, 31) is a torsion spring.

4. The yarn guide in accordance with claim 3, characterized in that the torsion spring (20, 21, 30, 31) is a spiral spring.

5. The yarn guide in accordance with claim 4, characterized in that two spiral springs (20, 21, 30, 31) are provided.

6. The yarn guide in accordance with claim 5, characterized in that the helical springs (20, 21, 30, 31) are used for supplying electrical current to the electromechanical drive mechanism (15, 15', 15", 16, 16', 18, 18', 22, 22', 24, 24', 25, 25').

7. The yarn guide in accordance with claim 5, characterized in that the direction of winding of the helical springs (20, 21, 30, 31) is opposite.

8. The yarn guide in accordance with claim 2, characterized in that the at least one spring (20, 21) has an adjustable suspension (20', 21'), by means of which a position of rest of the yarn guide (33) can be preset in the center of the oscillation amplitude.

9. By The yarn guide in accordance with claim 2, characterized in that the suspension (30, 31) of the at least one spring (20, 21) has a drive mechanism (36), which changes the position of the suspension (30, 31) during the oscillating movement of the yarn guide (33) on the basis of control signals from a control device (23).

10. The yarn guide in accordance with claim 9, characterized in that the drive mechanism (36) for adjusting the suspension (30, 31) can be controlled in such a way that it generates an oscillation frequency of the suspension (30,31) corresponding to the oscillation frequency of the yarn guide (33).

11. The yarn guide in accordance with claim 9, characterized in that the drive mechanism (36) for adjusting the suspension (30, 31) can be controlled in such a way that, with an increasing oscillation frequency of the yarn guide, the drive mechanism generates an increasing phase shift between oscillations of the yarn guide (33) and the suspension (30,31).

12. The yarn guide in accordance with claim 9, characterized in that the drive mechanism (36) for adjusting the suspension (30, 31) can be controlled in such a way that in a middle range of the oscillating movement, in which the angular velocity T of the yarn guide (33) is constant, the movements of the yarn guide (33) and of the suspension (30, 31) are identically directed, and that in the vicinity of the dead points, where the angular velocity T is greatly changed, they extend respectively opposite.

13. The yarn guide in accordance with claim 1, characterized in that the inertia of the oscillating yarn guide (33) and the characteristic curve of the at least one energy storage device (20, 21, 30, 31) are matched to each other in such a way that the system has a resonance frequency at the upper limit of the required oscillation frequency.

14. The yarn guide in accordance with claim 1, characterized in that the electromechanical drive mechanism (35) has an air gap (17), through which magnetic flux lines (19, 19', 23, 23') pass, magnets (18, 18', 22, 22', 24, 24', 25, 25') are arranged along the air gap (17), which generate the magnetic flux lines (19, 19', 23, 23'), which essentially extend vertically through the air gap (17), yokes (16, 16') for conducting the magnetic flux are arranged on both sides of the air gap (17), the yarn guide (33) has at least one electrical coil (15), which dips into the air gap (17) and is movable along the air gap (17) during the traversing movement of the yarn guide (33), and the electrical coil (15) can be supplied with current in a controlled manner.

15. The yarn guide in accordance with claim 14, characterized in that the air gap (17) extends over the pivot range of the electrical coil (15) which corresponds to the maximally settable traversing stroke of the yarn guide (33).

16. The yarn guide in accordance with claim 14, characterized in that a structure of a drive mechanism (36) of the suspension (30, 31) corresponds to that of the drive mechanism (35, 35') of the yarn guide.

* * * * *